United States Patent [19]

Winter et al.

[11] Patent Number: 4,579,420

[45] Date of Patent: Apr. 1, 1986

[54] TWO-POLE POWERED RUGGEDIZED OPTICAL FIBER CABLE AND METHOD AND APPARATUS FOR FORMING THE SAME

[75] Inventors: Joseph Winter, New Haven; Michael J. Pryor, Woodbridge, both of Conn.

[73] Assignee: Olin Corporation, New Haven, Conn.

[21] Appl. No.: 505,000

[22] Filed: Jun. 16, 1983

[51] Int. Cl.⁴ .............................................. G02B 6/44
[52] U.S. Cl. ............................... 350/96.23; 174/105 R
[58] Field of Search ................... 350/96.23; 174/105 R

[56] References Cited

U.S. PATENT DOCUMENTS

| | | | |
|---|---|---|---|
| 4,118,594 | 10/1978 | Arnaud | 350/96.23 |
| 4,239,336 | 12/1980 | Parfree et al. | 350/96.23 |
| 4,257,675 | 3/1981 | Nakogome et al. | 350/96.23 |
| 4,278,835 | 7/1981 | Jackson | 174/70 R |
| 4,317,003 | 2/1982 | Gray | 174/106 R |
| 4,341,440 | 7/1982 | Trezeguet et al. | 350/96.23 |
| 4,349,243 | 9/1982 | Amano et al. | 350/96.23 |
| 4,359,598 | 11/1982 | Dey et al. | 174/40 R |
| 4,361,381 | 11/1982 | Williams | 350/96.23 |
| 4,367,917 | 1/1983 | Gray | 350/96.23 |
| 4,371,234 | 2/1983 | Parfree et al. | 350/96.23 |
| 4,372,792 | 2/1983 | Dey et al. | 156/48 |
| 4,375,313 | 3/1983 | Anderson et al. | 350/96.23 |
| 4,398,058 | 8/1983 | Gerth et al. | 174/106 |
| 4,416,508 | 11/1983 | Dey et al. | 350/96.23 |
| 4,432,605 | 2/1984 | Niiro et al. | 350/96.23 |
| 4,490,009 | 12/1984 | Nakai et al. | 350/96.23 |

FOREIGN PATENT DOCUMENTS

| | | |
|---|---|---|
| 895094 | 5/1983 | Belgium . |
| 6364 | 1/1980 | European Pat. Off. . |
| 117227 | 11/1969 | United Kingdom . |
| 1480206 | 7/1977 | United Kingdom . |
| 1583276 | 1/1981 | United Kingdom . |
| 1584250 | 2/1981 | United Kingdom . |
| 2063502 | 6/1981 | United Kingdom .............. 350/96.23 |
| 1592192 | 7/1981 | United Kingdom . |

Primary Examiner—John Lee
Assistant Examiner—Lester Rushin, III
Attorney, Agent, or Firm—Barry L. Kelmachter; Howard M. Cohn; Paul Weinstein

[57] ABSTRACT

A two-pole ruggedized optical fiber cable suitable for use in communication applications is described. The cable has a core assembly comprising a sealed inner copper alloy tube in which at least one optical fiber is encapsulated. Surrounding the core assembly is a layer of dielectric material, an outer metallic tube and, if needed, a protective jacket. The outer tube's primary function is to serve as the cable's primary strength member. The outer tube is preferably formed from a high strength, non-ferrous alloy having a relatively low modulus of elasticity. The outer tube is preferably a drawn tube having a substantially straight axial seam. If added hermeticity is required, the outer tube seam may be sealed. A process and apparatus for fabricating the cable is also described.

25 Claims, 4 Drawing Figures

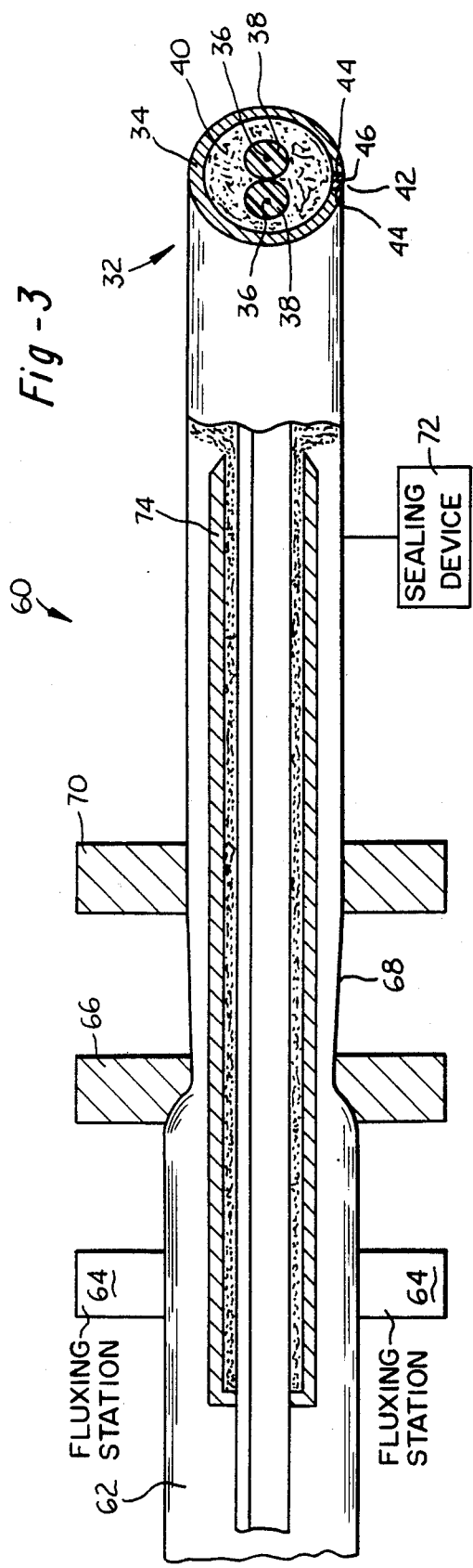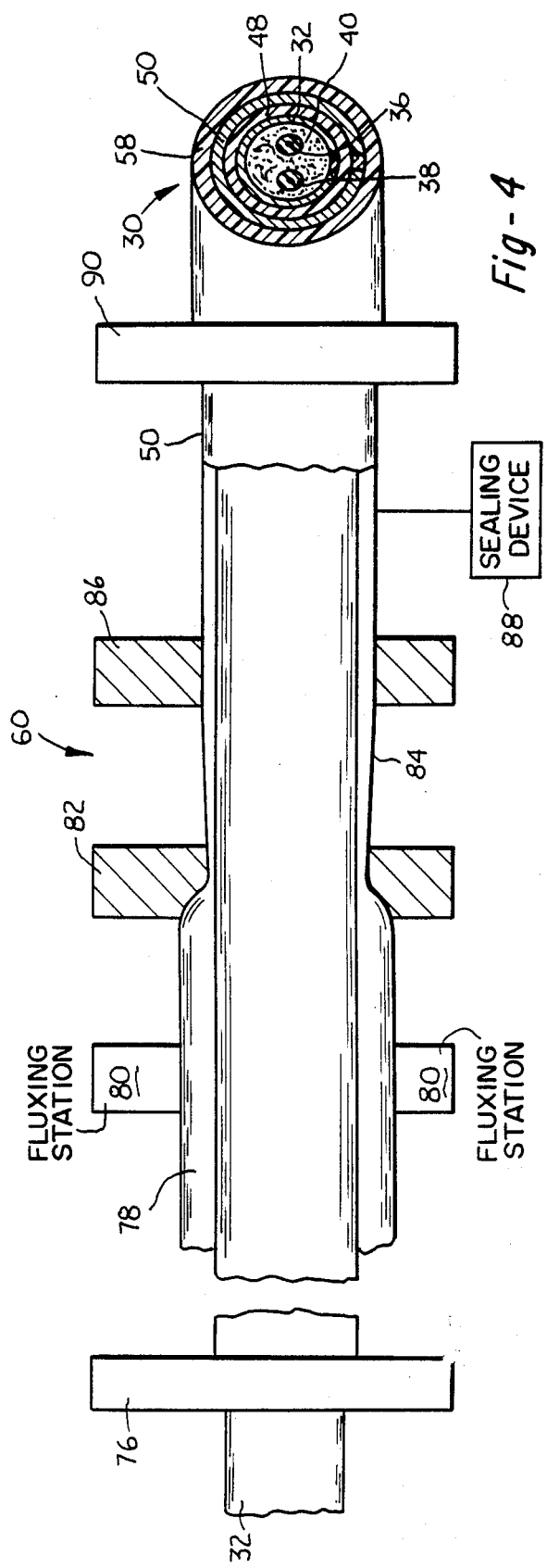

TWO-POLE POWERED RUGGEDIZED OPTICAL FIBER CABLE AND METHOD AND APPARATUS FOR FORMING THE SAME

This application is related to U.S. Ser. No. 413,846, filed Sept. 1, 1982, now U.S. Pat. No. 4,508,423, which is a continuation-in-part of U.S. Ser. No. 324,242, filed Nov. 23, 1981, now abandoned, for METHOD AND APPARATUS FOR ASSEMBLING AN OPTICAL FIBER COMMUNICATION CABLE; U.S. Ser. No. 395,443, filed July 6, 1982, for METHOD AND APPARATUS FOR ASSEMBLING A COMPACT MULTI-CONDUCTOR OPTICAL FIBER COMMUNICATION CABLE, now U.S. Pat. No. 4,479,702; U.S. Ser. No. 430,069, filed Sept. 30, 1982, for PROCESS FOR DIE FORMING A TUBULAR MEMBER AT A REDUCED DRAWING FORCE, now allowed; U.S. Ser. No. 497,639, filed May 24, 1983, now U.S. Pat. No. 4,477,147, which is a continuation-in-part of U.S. Ser. No. 395,443, filed July 6, 1982, and U.S. Ser. No. 413,846, filed Sept. 1, 1982, for METHOD AND APPARATUS FOR ASSEMBLING AN OPTICAL FIBER COMMUNICATION CABLE; U.S. Ser. No. 497,535, filed May 24, 1983, now allowed, which is a continuation-in-part of U.S. Ser. No. 413,846, filed Sept. 1, 1982, for PROCESS AND APPARATUS FOR FABRICATING OPTICAL FIBER CABLES; U.S. Ser. No. 497,533, filed May 24, 1983, which is a continuation-in-part of U.S. Ser. No. 408,087, filed Aug. 13, 1982 now abandoned, for OPTICAL FIBER COMMUNICATION CABLES AND METHOD FOR ASSEMBLING SAME; U.S. Ser. No. 497,546, filed May 24, 1983, which is a continuation-in-part of U.S. Ser. No. 272,154, filed July 10, 1981, now abandoned, for METHOD AND APPARATUS FOR ASSEMBLING AN OPTICAL FIBER COMMUNICATION CABLE; and U.S. Ser. No. 497,522, filed May 24, 1983, which is a continuation-in-part of U.S. Ser. No. 461,736, filed Jan. 28, 1983, now abandoned, for PROCESS AND APPARATUS FOR FABRICATING TUBULAR STRUCTURES.

The invention described herein relates to an optical fiber cable suitable for use in a variety of communication applications.

The use of optical fibers as a transmission media has now become well established. Cables employing optical fibers have been used in a wide variety of aboveground, underground and undersea environments as replacements or substitutes for conventional coaxial cables. The advantages of such optical fiber cables over conventional coaxial cables include low loss, a wide transmission band and a light weight. All of these advantages are directly traceable to the use of optical fibers as a transmission media.

The primary deficiency of most optical fiber cables is their fragility as characterized by low strength and susceptibility to environmental damage, especially in the presence of water. When intended for use in undersea applications, optical fiber cables have to be designed to withstand the stresses associated with water pressure and sea action. Of particular importance, is the ability of the cable to resist the ingress of water. In addition, the cables must exhibit a reasonable degree of flexibility so that they may be wound onto and off reels or sheaves and may be deployed without damaging the optical fiber or fibers encapsulated therein.

Prior art cable constructions have attempted to meet these design criteria through the use of a variety of structural features. Frequently, the optical fibers are protected by housing them within a metallic containment tube. The containment tube acts as a strength member and where needed as an electrical conductor. Sometimes, the containment tube has a seam that is welded or soldered to supply additional strength and hermeticity. The metal tube is often encapsulated within one or more protective layers. The protective layer or layers are frequently formed from suitable plastic materials such as high density polyethylene or polypropylene. Where additional strengthening is required, the cable may have one or more layers of plastic filaments, steel wires, or wire ropes wrapped about the containment tube. U.S. Pat. Nos. 4,257,675 to Nakagone et al., 4,341,440 to Trezeguet et al., 4,349,243 to Amano et al., 4,371,234 to Parfree et al. and 4,372,792 to Dey et al. illustrate several prior art cable constructions.

Where resistance to water ingress has been of particular concern, some cables have incorporated into their structure an additional metal or metal alloy tube that functions as a water barrier. Often, the additional tube is formed from a metal or metal alloy tape. U.S. Pat. No. 4,278,835 to Jackson and U.K. Patent Nos. 1,480,206 to Rickaby, 1,583,276 to Webster et al. and 1,584,250 to Dean exemplify optical fiber cable constructions having at least one metal or metal alloy water barrier layer. Generally, these metal or metal alloy water barrier layers are not intended to play a significant role in strengthening the cable construction.

Wire reinforcement of a cable containing a glass fiber creates special problems in that there is a substantial risk of subjecting the fiber to microbends or kinks that could increase fiber attenuation. Since the wire reinforcement often has to be placed on in a helical configuration and since the various reinforcement wires must be reasonably spaced to avoid snarling, microbending is highly probable if the cable is in a high tension condition and any of the reinforcement wires are not in equilibrium with the surroundings. Microbending most likely results from the torsional stresses applied to the fiber by the helical wrapping of the reinforcing wires. To overcome this problem, wire reinforcement is generally done in more than one layer with alternate layers being contrahelically wound. By doing this, it is possible to avoid introduction of a single direction torque into the system.

Encapsulating the tube in multiple wire layers does create other problems. For example, the multiple wire layers add weight to the cable and decrease cable flexibility. Further, the multiple layers increase the cross-sectional area of the cable. It is not unusual for the wire layers to occupy 60% to 70% of the cable cross-sectional area.

As previously discussed, for many cable applications the metal containment tube housing the optical fiber or fibers is used as an electrical conductor. For example, the metal tube may be used as one leg of a power transmission system with the return being the environment, e.g. seawater. In situations where the environment is not conductive or is unreliable, the cable may be provided with another conductor to act as the return. Sometimes, the additional strengthening means, such as the cabled wires, perform this role and act as the return. Other times, the cable is provided with one or more coaxial transmission lines. U.S. Pat. Nos. 4,118,594 to Arnaud and 4,239,336 to Parfree et al., U.K. Patent Nos. 1,172,272 to Kao et al. and 1,592,192 to Dean and published European patent application No. 6364 to Goldberg et al. illustrate some of these cable constructions.

Typically, a coaxial cable construction has inner and outer coaxial metal conductors insulated one from the other by a dielectric spacer. Frequently, the inner conductor and/or the outer conductor are formed from copper. Copper is a preferred material because of its electrical conductivity properties. However, copper has relatively moderate strength properties. As a result, where strength is an important consideration, the cable construction often includes a strengthening member such as a layer of helically wrapped plastic threads or metal wires.

In accordance with the present invention, an optical fiber communication cable is provided that has strength and flexibility properties substantially equal to those of reinforced cable constructions having at least one wrapped wire or filament strengthening layer but yet has a smaller cross-sectional area than said reinforced cable constructions. In lieu of the wrapped wire or filament layer or layers, the optical fiber cable of the instant invention employs as the primary cable strength member a solid, hollow, cylindrical tube formed from a high strength metallic material. Where needed, the hollow tube may also function as an electrical conductor.

In a preferred construction, the cable of the instant invention has a core assembly comprising a sealed metallic containment or core tube housing one or more optical fibers. Preferably, each optical fiber has a suitable buffer material surrounding it. If needed, a suitable filler material may also be housed within the core tube. Where needed, the sealed metallic core tube may act as one leg of a conducting pair. So that the core tube may be electrically and physically isolated, a dielectric layer is formed about the tube. The dielectric layer preferably comprises a suitable plastic material. The solid, hollow cylindrical outer tube which acts as the primary strength member is fabricated about the dielectric layer. Where needed, this tube may function as a secondary leg of a conducting pair. The cable may be used with the outer tube as an external member or with a further protective layer about the outer tube.

In a preferred manner of fabricating the cable of the instant invention, the core tube is formed from a strip of suitable metallic material using a die forming technique. Preferably, the tube is formed with a substantially straight longitudinal seam characterized by seam edges in a closely abutting relationship. The seam may be closed using a suitable sealing technique. Preferably, the seam is closed by a suitable soldering or brazing technique.

The material from which the core tube is formed should possess certain conductivity, strength, and softening resistance properties. The material should possess a relatively high conductivity so that the tube may act as an electrical conductor. The tube material should also possess significant yield strength and yield strain so that the tube will be in a substantially elastic state for most degrees of cable bending. The tube material should possess good resistance to softening upon short-term exposure to elevated temperatures so that it will not lose significant strength during any sealing operation. The tube material should have a conductivity in the range of about 25% to about 102% IACS, a yield strength of at least about 30 ksi, preferably at least about 50 ksi, a yield strain in the range of about 0.15% to about about 1%, preferably about 0.3% to about 0.95%, and a minimum tensile strength of about 45 ksi at 400° F. The tube material is preferably a copper alloy.

Suitable copper alloys exhibiting the requisite properties in accordance with this invention for the core tube comprise alloys drawn from the following systems: copper-zirconium, copper-chromium, copper-iron, copper-silver, copper-magnesium-phosphorous and copper-nickel-silicon. Generally in such copper alloy systems copper is present in an amount of at least about 95% and represents the balance of the alloy. The alloying elements may be selected from the group consisting of zirconium, chromium, iron, magnesium, phosphorous, nickel, silicon, tin and silver as well as combinations thereof. For those applications where a moderate strength level and a conductivity in excess of about 50% IACS are needed, the alloying elements are preferably present in an effective amount to provide the desired strength and softening resistance up to about 5% by weight of the alloy and most preferably in such an effective amount up to about 3% by weight of the alloys. Suitable tube materials include Copper Alloys 151, C15500, C19400 and C19500.

In order to meet the design tensile parameters of an optical fiber cable, the cylindrical tubular strength member or outer tube of the instant invention is preferably formed from a high strength, low conductivity material. Preferably, the outer tube material comprises a non-ferrous alloy having a relatively low modulus of elasticity. The use of a low modulus, non-ferrous alloy provides several advantages. First, cable success is governed by critical limits of tensile strain rather than maximum load bearing capability. This limitation is imposed by the maximum strain the glass fiber or fibers can sustain before breaking. Low modulus, non-ferrous alloys have a tensile strain that is more compatible with the fiber maximum strain than reinforced wire constructions. Second, low modulus materials have a higher degree of flexure. This permits the radius of curvature for elastic bending around a reel or a sheave to be decreased.

In order to best take advantage of the above, the outer tube is preferably formed from a high strength copper alloy having a yield strength in the range of about 100 ksi to about 180 ksi, preferably from about 125 ksi to about 150 ksi, and a yield strain in the range of about 0.57% to about 1%, preferably from about 0.7% to about 0.9%. The alloy also preferably possesses an electrical conductivity in the range of about 2% to about 10% IACS.

Suitable copper alloys exhibiting the requisite properties for an outer tube in accordance with the instant invention comprise copper alloys having an effective amount of at least one alloying element selected from the group consisting of aluminum, silicon, cobalt, tin, phosphorous, magnesium, manganese, nickel and chromium as well as combinations thereof. Generally, copper is present in an amount of at least about 95% and represents the balance of the alloy. However, for some applications, the copper content may be as low as about 85%. Suitable outer tube materials include C.D.A. Copper Alloys 63800, 65400, and 51000.

In a preferred method of fabrication, the outer tube is formed from a strip of suitable material using a die-forming technique. Preferably, the tube is formed with a substantially straight seam. Where desired, the seam may be sealed, preferably by soldering or brazing the seam, to provide added hermeticity.

In accordance with the instant invention, the optical fiber cable is preferably fabricated by first forming a suitable copper alloy strip into the core tube with the use of one or more forming dies. The seam of the resultant core tube is then sealed preferably by soldering or brazing. During the tube formation and seam sealing operation, at least one optical fiber and a suitable filler material, if needed, are housed within a protective sheath about which the tube is formed. After the tube is formed and preferably after the seam is sealed, the optical fiber or fibers and any filler material are released into the tube. After the core assembly has been formed, a suitable dielectric layer is fabricated about the sealed core tube. Following fabrication of the dielectric layer, the assembly is encapsulated within the cylindrical tubular strength member or outer tube. Preferably, the outer tube is formed by drawing a suitable high strength material through one or more forming dies. If needed, an outer protective jacket may be fabricated about the outer tube using a suitable fabrication device.

In an alternative method of forming the optical fiber cable of the instant invention, the core tube and/or the outer tube are formed from a preformed strip having a suitable open tube section configuration, e.g. substantially U-shaped or shaped to have a minor diameter less than the desired diameter of the tube to be formed. The preformed strip is then drawn through a suitable die to form the respective tube. When using this technique to form the outer tube, the core tube assembly and surrounding dielectric layer are inserted into the forming tube substantially simultaneous with the closure of the preformed strip.

Accordingly, it is an object of this invention to provide an improved two-pole power ruggedized optical fiber transmission cable.

It is a further object to provide a cable as above having strength and flexibility properties substantially equal to equivalent reinforced wire or filament cable constructions but having a smaller cross-sectional area than said reinforced cable constructions.

It is a further object to provide a process and apparatus for making the above cable.

These and other objects will become more apparent from the following description and drawings in which like elements have been given like reference numbers.

FIG. 3 is a schematic representation in partial cross section of an apparatus for forming the core assembly of the cable of FIG. 2.

FIG. 4 is a schematic representation in partial cross section of an apparatus for completing the optical fiber cable of FIG. 2.

In accordance with the present invention, it is proposed to eliminate the need for strengthening members such as helically wrapped wires or plastic filaments in optical fiber cables, particularly two-pole or coaxial optical fiber cables. This is accomplished by fabricating a solid hollow unitary cylindrical tubular strengthening member from a high strength, low modulus, non-ferrous material such as a high strength, low modulus copper alloy. The tubular strengthening member functions as the primary strength member in the cable of the instant invention. In two-pole or coaxial cable applications, the tubular strengthening member may also function as an electrical conductor such as a secondary leg of a conducting pair.

It is also desired in accordance with the present invention to provide an optical fiber cable having a much smaller cross-sectional area than prior art reinforced cable constructions. The use of a tubular strength member formed from a high-strength material in lieu of a helically wrapped wire or plastic filament strength layer or layers permits the reduction in cable cross-sectional area. The use of a tubular strength member in lieu of a helically wrapped reinforcing layer or layers also reduces the risk of creating torsional stresses that may subject the optical fiber or fibers to microbends that may increase attenuation.

Figure 1:
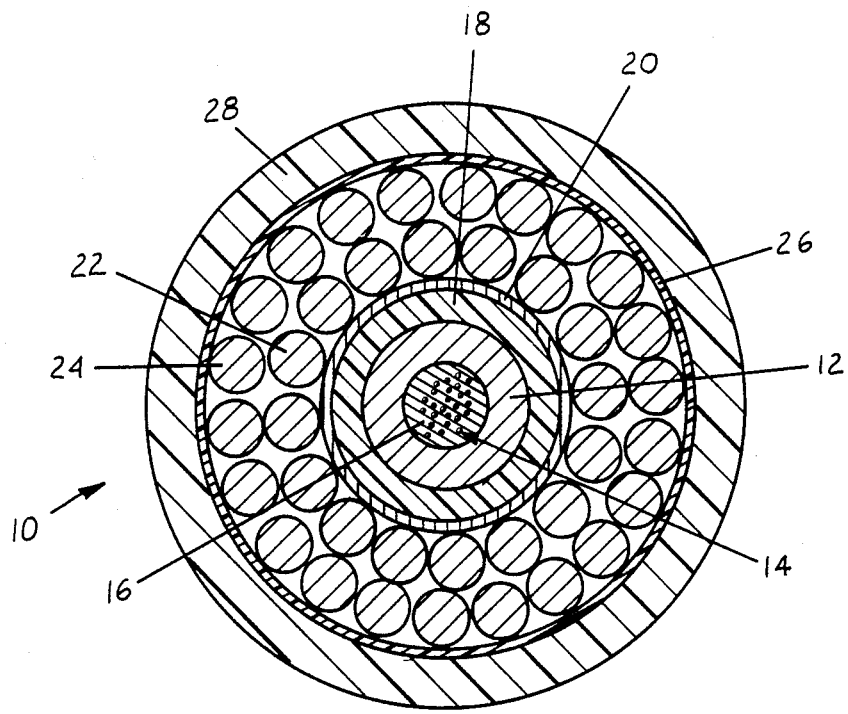
FIG. 1 is a cross-sectional view of a prior art reinforced optical fiber cable construction.

Referring now to FIG. 1, there is shown a prior art cable construction 10. The cable construction 10 has a metal tube 12 in which a plurality of optical fibers 14 are housed along with a filler material 16. The tube 12 is formed from a metal such as copper or aluminum and may be used to transmit electrical power between repeaters not shown. A layer of polycarbonate material 18 for providing dielectric insulation and strength surrounds the tube 12. An aluminum water barrier 20 surrounds the layer 18. The aluminum water barrier 20 is, in turn, surrounded by first and second layers 22 and 24 respectively of stranded metal wires. The wire layers 22 and 24 being wrapped in opposing directions. A MYLAR wrapping tape layer 26 surrounds the two layers of stranded wires and finally a polyethylene outer sheath 28 is fitted about the structure. In some prior art cable constructions, the wire strengthening or reinforcing layers may occupy as much as 60% to 70% of the cable cross-sectional area.

Figure 2:
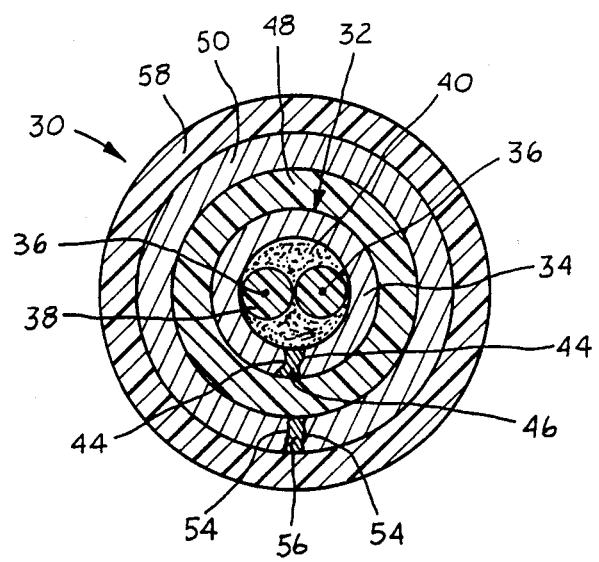
FIG. 2 is a cross-sectional view of an optical fiber cable of the present invention.

Referring now to FIG. 2, there is shown an optical fiber cable 30 in accordance with the instant invention. The optical fiber cable 30 has a core assembly 32 composed of a metal core tube 34 encapsulating at least one optical fiber 36 surrounded by a protective buffer layer or coating 38. Preferably, the metal core tube 34 houses from one to six optical fibers, each surrounded by a suitable buffer material 38, and closely surrounds the fiber or fibers 36 and their respective coatings 38. Where needed, an appropriate filler material 40 may also be housed in the tube 34. The metal tube 34 is preferably formed with a substantially straight longitudinal seam 42 having closely abutting edges 44. In a preferred embodiment, seam 42 is closed by a suitable solder or brazing material 46 to provide the core assembly 32 with a hermetic seal.

Metal tube 34 may be used as an electrical conductor such as one leg of a power transmission system with the return either being the environment or another metallic cable component. For example, tube 34 may be used to carry current between repeaters not shown which may be spaced apart as desired. A layer 48 of suitable dielectric material surrounds the tube 34 to electrically isolate the tube.

Surrounding the dielectric layer is a second metal tube 50 which serves as the cable's primary strength member. If needed, the metal tube 50 may also function as an electrical conductor such as a secondary leg of a conducting pair. The metal tube 50 also is preferably formed with a substantially straight longitudinal seam 52 having closely abutting edges 54. The second tube 50 may or may not be sealed along the seam 52 depending upon whether or not added hermeticity is desired. If sealed, a suitable soldering or brazing material 56 is preferably used to close the seam 52. An outer protective jacket 58 may be fabricated about the tube 50 to provide additional protection where needed. For some cable uses, jacket 58 may be omitted.

The metal core tube 34 is preferably formed from a wrought material which is in a partially work hardened state. The metal tube 34 should be further work hardened by the tube forming process which will be described hereinafter. The material used to form metal tube 34 should possess certain conductivity and strength properties. The material should possess a high conductivity since the tube 34 preferably acts as a conductor in the final cable construction. The tube material preferably possesses significant yield strength and a relatively high yield strain so that the tube 34 may be maintained in a substantially elastic state for any degree of cable bending which may be encountered. By having the tube 34 maintained in a substantially elastic state and substantially never in a plastic state the risk of breaking the glass fiber or fibers 36 due to placing them in tension is minimized. The tube material should also possess good resistance to softening upon short-term exposure to elevated temperatures so that it will not lose significant strength during any sealing operation and should be capable of sustaining coiling forces during fabrication and installation.

The tube material 34 preferably has a conductivity in the range of about 25% to about 102% IACS, a yield strength of at least about 30 ksi, most preferably at least about 50 ksi, a yield strain in the range of about 0.15% to about 1%, most preferably about 0.3% to about 0.95% and a diameter-to-thickness ratio of about 5:1 to about 25:1, most preferably from about 10:1 to about 20:1. As used herein, the term yield strain is the strain at the yield strength at 0.2% offset.

A number of metals and alloys possess the required combinations of strength and conductivity such as copper and its alloys and steel and may, therefore, be utilized. However, as will be described more fully hereinafter, since the tube material is subjected to heating during the seam sealing operation, preferably while the tube 34 is maintained under tension, the tube 34 should preferably be formed from a material having a minimum tensile strength of about 45 ksi at 400° F. In a preferred embodiment, the tube 34 is formed from a copper alloy. Suitable copper alloys exhibiting the requisite properties comprise alloys drawn from the following systems: copper-zirconium, copper-chromium, copper-iron, copper-silver, copper-magnesium-phosphorous and copper-nickel-silicon, etc. Generally, in such copper alloy systems copper is present in an amount of at least about 95% and represents the balance of the alloy. The alloying elements may be selected from the group consisting of zirconium, chromium, iron, magnesium, phosphorous, nickel, silicon, tin and silver as well as combinations thereof. For applications where a moderate strength level and a conductivity greater than about 50% IACS are needed, the alloying elements should preferably be present in an effective amount to provide the desired strength and softening resistance up to about 5% by weight of the alloy and most preferably in such an effective amount up to about 3% by weight of the alloy. For any of the abovementioned copper alloy systems, at least one of the alloying elements is preferably present in a minimum amount of at least about 0.01% by weight of the alloy.

In a preferred embodiment, the material forming the core tube 34 comprises a high copper alloy containing zirconium, designated as Copper Alloy 151. Copper Alloy 151 has an electrical conductivity of about 95% IACS, a yield strength of about 62 ksi, and a yield strain of about 0.36%. In addition to alloy 151, other suitable core tube materials include C.D.A. Alloys 15500, 19400 and 19500.

The tubular strengthening member or outer tube 50 is also preferably formed from a wrought material which is in a partially work hardened state. Hereto, the metal tube 50 will be further work hardened by the preferred tube forming process to be described hereinafter. Since the tube 50 is intended to be the primary strength member in the cable, the tube material 50 preferably possesses a relatively high yield strength and a relatively high yield strain. Since any role that the tube 50 may play as an electrical conductor is secondary to its strength function, the tube material 50 may have a conductivity lower than that of the tube material 34. If the tube 50 is to be sealed, the tube material should also possess good resistance to softening upon short-term exposure to the elevated temperatures that may be encountered during any sealing operation.

The tube material 50 preferably has a yield strength in the range of about 100 ksi to about 180 ksi, most preferably from about 125 ksi to about 150 ksi, a yield strain in the range of about 0.57% to about 1%, most preferably from about 0.7% to about 0.9% and an electrical conductivity in the range of about 2% to about 10% IACS. It is further preferred that the tube material 50 be a non-ferrous material having a relatively low modulus of elasticity. As used herein the term relatively low modulus of elasticity means a modulus of elasticity less than about $20 \times 10^6$ psi. Suitable tube materials 50 include copper alloys and aluminum and its alloys.

Using a relatively low modulus, non-ferrous material for the tube 50 provides several distinct advantages: first, cable success is governed by critical limits of tensile strain rather than maximum load bearing capability. This limitation is imposed by the maximum strain each glass fiber 36 can sustain before breaking. Relatively low modulus, non-ferrous materials have a tensile strain that is more compatible with the maximum glass fiber strain. Second, the degree of flexure is higher for low modulus materials. This permits the radius of curvature for elastic bending around a reel or a sheave to be decreased. It also permits construction of a cable having a flexibility that approaches the flexibility of prior art wire constructions.

In a preferred embodiment, the outer tube 50 is formed from a high strength copper alloy. High strength copper alloys are preferable to ferrous alloys in that they generally are at least about five times more conductive than any of the stainless steels or iron alloys. Suitable copper alloys exhibiting the requisite properties comprise copper alloys having alloying elements selected from the group consisting of aluminum, silicon, cobalt, tin, phosphorous, magnesium, manganese, nickel and chromium as well as combinations thereof. Generally, copper is present in an amount of at least about 95% by weight and represents the balance of the alloy. The alloying elements are preferably present in an effective amount up to about 5% by weight of the alloy. The alloying elements should be present in an amount of at least about 0.01% by weight of the alloy. For some cable applications, a copper alloy may be used that has copper present in an amount as low as about 85% by weight. In this alloy, the alloying elements may be present in an effective amount up to about 15% by weight of the alloy.

Suitable copper alloys exhibiting the requisite properties for the outer tube 50 include alloys drawn from the following systems: a copper-tin-phosphorous alloy consisting essentially of from about 4% to about 6% tin, from about 0.03% to about 0.35% phosphorous and the balance essentially copper; a copper-aluminun-silicon-cobalt alloy consisting essentially of from about 2.5% to about 3.1% aluminum, from about 1.5% to about 2.1% silicon, from about 0.25% to about 0.55% cobalt and the balance essentially copper; a copper-aluminum-silicon alloy consisting essentially of from about 2% to about 3.5% aluminum, from about 1% to about 2.5% silicon and the balance essentially copper; and a copper-silicon-tin-chromium alloy consisting essentially of from about 2.7% to about 3.4% silicon, from about 1.2% to about 2% tin, from about 0.01% to about 0.12% chromium and the balance essentially copper. As used herein, the above percentages are weight percentages. In a preferred embodiment, the tube material is selected from one of the following copper alloys: C.D.A. Copper Alloy 51000, C.D.A. Copper Alloy 63800, C.D.A. Copper Alloy 65400 and alloy C63810.

One advantage to forming a solid hollow cylindrical tubular strength member from such a material is that the cross-sectional area of the tubular member is less than the cross-sectional area of an equivalent wire contruction. For most applications, at least a 30% advantage in cross-sectional area can be achieved using the tubular strength member construction of the instant invention in lieu of an equivalent wire construction.

Referring now to FIGS. 3 and 4, an apparatus 60 for assembling the cable of the instant invention is illustrated. In FIG. 3, an apparatus for fabricating the core assembly 32 is shown. A strip 62 of suitable metallic material is preferably formed into core tube 34 by drawing the strip through a fluxing station 64, then through a die 66 for forming the strip 62 into an open tube section 68 and finally through a die 70 for closing the open tube section 68. In the die 66, the strip 62 is formed into an open tube section that preferably has a minor diameter that is less than the diameter of the tube 34 to be formed. The die 66 preferably comprises a die having a substantially circular bore with a relief notch. The die 70 preferably comprises a suitable conventional bending-expansion die. The manner in which the dies 66 and 70 form the strip 62 into a tubular structure is more fully described in copending U.S. patent application Ser. No. 497,522, to Winter et al., filed May 24, 1983, for a PROCESS AND APPARATUS FOR FABRICATING TUBULAR STRUCTURES which is hereby incorporated by reference. Preferably, tube 34 is formed with the seam 42 facing downwardly.

In lieu of the aforementioned two-die tube forming technique, core tube 34 could be formed using the two-die technique shown in copending U.S. patent application Ser. No. 497,533, to Winter et al., filed May 24, 1983, for OPTICAL FIBER COMMUNICATION CABLES AND METHOD AND APPARATUS FOR ASSEMBLING SAME or the one-die technique shown in copending U.S. patent application Ser. No. 497,546, to Winter et al., filed May 24, 1983, for METHOD AND APPARATUS FOR ASSEMBLING AN OPTICAL FIBER CABLE, both of which are hereby incorporated by reference.

In yet another alternative embodiment for fabricating the cable of the instant invention, the die 66 may be replaced by a roll forming apparatus not shown for forming the strip 62 into a desired open tube configuration. The roll forming apparatus may comprise any suitable conventional roll forming apparatus known in the art.

In still another alternative embodiment for fabricating the cable of the instant invention, the core tube 34 may be formed by starting with a preformed strip not shown. In lieu of passing the strip 62 through the die 66 to form the open tube section, the strip 62 could be preformed to have a desired open tube configuration. For example, the strip could be preformed to have a substantially U-shaped cross-sectional configuration or a cross-sectional configuration having a minor diameter less than the desired diameter for the tube to be formed. Tube 34 may be formed by drawing the preformed strip through a suitable closing die.

The strip 62 may comprise a single length of material or may be a plurality of lengths joined together. If the strip 62 comprises a plurality of joined lengths, the lengths may be joined in any suitable manner.

Prior to undergoing the tube forming operation, the strip 62 may be passed through a suitable cleaning system not shown for removal of contaminants. The cleaning system utilized will depend upon the material forming the strip and the nature of the contaminants to be removed. Any suitable conventional cleaning system known in the art may be utilized.

Fluxing station 64 may comprise any conventional means known in the art for applying any conventional flux preferably to the edges of the strip 62. Since the fluxing station is not absolutely necessary to form the tube 34, it may be omitted if desired.

The strip 62 may be fed into the apparatus 60 by any suitable means known in the art. Preferably, a tensile force is applied to the strip 62 to draw it through the dies 66 and 70. Any suitable pulling means not shown known in the art may be used to apply the tensile force to the strip 62.

After formation of the core tube 34 has been completed, it is passed to a station 72 for closing the seam 42. Since the seam 42 is preferably facing downward, the tube 34 and seam 42 preferably passes over the sealing station 72. Sealing station 72 may comprise any suitable device known in the art for sealing a tube seam. For example, it may be means for soldering, welding or brazing the seam, means for fusion bonding the seam, or means for applying any other sealing technique known in the art. In a preferred embodiment, the sealing device 72 comprises means for filling the seam 42 with a suitable solder or brazing material 46. Suitable soldering means which may be used to close the seam 42 are described in copending U.S. patent application Ser. Nos. 413,846 to Winter et al., filed Sept. 1, 1982, for METHOD AND APPARATUS FOR ASSEMBLING AN OPTICAL FIBER COMMUNICATION CABLE, now U.S. Pat. No. 4,508,423, and 497,535 to Winter et al., filed May 24, 1983, for PROCESS AND APPARATUS FOR FABRICATING OPTICAL FIBER CABLES, now allowed, which are hereby incorporated by reference. Preferably, the solder or brazing material 46 is applied in such a manner that it capillaries up into and substantially fills the seam 42. During sealing of the seam, it is preferred to maintain the tube 34 under tension. As previously mentioned, the tube material 34 should have good softening resistance since the tube 34 will more than likely become heated for a short period of time during the sealing operation.

In accordance with this invention, the optical fiber or fibers 36 are preferably fed into the core tube 34 without any substantial back tension. This may be accomplished through the use of a slack loop and dancer arrangement not shown or any other desired technique wherein the fiber or fibers 36 merely travel along with the core tube 34 as the tube 34 is formed. A result of the processes in accordance with this invention is that the length of each optical fiber 36 after fabrication exceeds the length of the tube 34 by less than about 1%. Each fiber 36 is, therefore, in slight compression rather than in tension which could deleteriously affect its transmission properties. Since each fiber 36 is fed into the tube 34 during the tube forming operation without any substantial back tension, removal of the drawing or tensile force for forming the tube 34 causes the tube material to elastically contract thereby providing the relative difference in the length of the tube 34 versus the length of each fiber 36. The manner in which the fiber or fibers 36 are inserted into the tube 34 and placed in compression is more fully described in copending U.S. patent application Ser. No. 497,639, to Winter et al., filed May 24, 1983, for METHOD AND APPARATUS FOR ASSEMBLING AN OPTICAL FIBER CABLE, now U.S. Pat. No. 4,477,147, which is hereby incorporated by reference.

During the tube forming and seam sealing operations, the fiber or fibers 36 and any needed filler material 40 are preferably housed within a suitable protective sheath 74. The fiber or fibers 36 and the filler material 40, if any, are released from the sheath 74 into the tube 34 preferably after the sealing operation is completed. Preferably, the sheath 74 is formed from a material that will not be bonded to the tube 34 by the sealing operation.

To help solidify the solder or brazing material 46 in a rapid manner, a suitable air cooling or water quenching device not shown may be provided adjacent the exit of the sealing device 72. Any suitable air cooling or water quenching device known in the art may be utilized. If excess solder or brazing material is present about the periphery of tube 34, the sealed tube 34 may be passed through a suitable shaving die not shown to remove the excess material and to improve the concentricity of tube 34. Any suitable shaving die known in the art may be used.

After the tube 34 has been formed and the seam 42 has been sealed, a layer of dielectric material 48 is fabricated about the core assembly 32. The dielectric material 48 electrically isolates the tube 34 and provides additional hermeticity. The dielectric material 48 may comprise any suitable plastic material such as high density polyethylene, nylon, an acrylic or a polyester elastomer sold under the trademark HYTREL by the Dupont Corporation. The layer of dielectric material 48 may be extruded about the core assembly 32 using any suitable conventional apparatus 76 known in the art.

After fabrication of the dielectric layer 48 has been completed, the solid, hollow, cylindrical, unitary tubular strength member or outer tube 50 is fabricated about the layer 48. Because the tube 50 is to be formed from a high strength material, it is preferred to use a two-die tube forming technique similar to the two-die technique used to form the tube 34. A strip 78 of suitable high strength material is first pulled through a suitable apparatus 80 for fluxing the strip edges. As before, prior to fluxing the strip 78 may be passed through a suitable cleaning system not shown to remove any contaminants. The fluxing apparatus 80 may comprise any conventional fluxing apparatus known in the art. The strip 78 is then drawn or pulled through a first die 82 where it is formed into an open tube section 84 having a cross-sectional shape with a minor diameter less than the desired cross-sectional diameter for the tube 50. Thereafter, the open tube section 84 is drawn or pulled through a second die 86 to close the open tube section 84 and form the tube. Any suitable pulling means not shown known in the art may be used to apply a tensile force to the strip 78 and tube section 84 to pull them through the dies 82 and 86.

Preferably, the tube 50 is formed with a substantial straight longitudinal seam 52 facing downwardly and parallel to the cable direction. In accordance with the processes of the instant invention, pulling the open tube section 84 through the die 86 should place the edges 54 defining the seam 52 in a closely abutting relationship.

The die 82 preferably has a substantially circular core with a relief notch not shown. The die 86 preferably comprises a bending-expansion die. The dies and the manner in which they form a strip into a tube having a seam characterized by closely abutting edges is more fully described in copending U.S. patent application Ser. No. 497,522, to Winter et al., filed May 24, 1983, for PROCESS AND APPARATUS FOR FABRICATING TUBULAR STRUCTURES which is hereby incorporated by reference.

In lieu of the two-die technique described above, the two-die technique described in copending U.S. patent application Ser. No. 497,533, to Winter et al., filed May 24, 1983, for OPTICAL FIBER COMMUNICATION CABLES AND METHOD AND APPARATUS FOR ASSEMBLING SAME which is hereby incorporated by reference, may be used to form the tube 50. In an alternative fabrication technique, the die 82 may be replaced by a roll forming apparatus not shown. The roll forming apparatus may comprise any conventional roll forming apparatus suitable for forming an open tube section having the desired cross-sectional shape.

In still another alternative fabrication technique, the die 82 may be eliminated by forming the tube 50 from a preformed strip not shown of high strength material. The strip 78 may be preformed to have any suitable cross-sectional configuration. For example, the preformed strip could have a substantially U-shaped cross-sectional configuration or an open tube cross-sectional configuration with a minor diameter less than the cross-sectional diameter desired for the tube 50. The tube 50 would be formed by drawing the preformed strip through a suitable closing die. When a preformed strip is used, the core assembly 32 and surrounding dielectric layer 48 are inserted into the tube substantially simultaneous with the closure of the strip.

For some materials, it may be possible to use a one-die tube forming technique such as that shown in the aforementioned copending U.S. patent application No. 497,546, to Winter et al., which is hereby incorporated by reference, to form the strip 78 into the tube 50. Where possible, the one-die forming technique may be substituted for the two-die forming technique shown in FIG. 4.

After the tube 50 has been formed, the seam 52 may be sealed if it is desired to provide additional hermeticity. For certain applications, it may not be necessary to seal the seam 52. Where the seam 52 is to be sealed, the tube 50 and the seam 52 are passed over a suitable sealing device 88. Sealing device 88 may comprise any suitable device known in the art such as a device for soldering, brazing, welding or fusion bonding the seam 52. Preferably, the seam 52 is closed using a soldering or brazing device. The sealing device 88 preferably causes the soldering or brazing material 56 to capillary up into and substantially fill the seam 52. The sealing device 88 is preferably the same type as the sealing device 72. The tube 50 should be maintained under tension during any seam sealing operation so that the seam is maintained substantially straight.

After the tube 50 has been formed and/or the seam 52 has been sealed, an outer jacket 58 may be formed about the tube 50. Outer jacket 58 may be formed from any suitable material such as a protective plastic, rubber, nylon, neoprene, or the like. A suitable apparatus 90 may be provided to fabricate the outer jacket 58. In a preferred embodiment, the outer jacket 58 comprises a layer of black polyurethane and the apparatus 90 comprises any suitable extrusion apparatus known in the art.

In carrying out the invention described herein, it has been found to be quite advantageous to form the tubes 34 and 50 from respective strips 62 and 78 each having a transverse cross-sectional area which exceeds the desired transverse tube cross-sectional area by about 5% to about 20%, preferably by about 8% to about 17% and most preferably by about 10% to about 15%. With the tube-forming techniques described herein the extra volume of metal or metal alloy provided by the excess cross-sectional area shows up essentially as longitudinal extension of the resulting tube. It has been found that using the tube forming techniques described herein there is no significant change in wall thickness. The wall thickness of each of the tubes 34 and 50 is substantially the same as the thickness of its respective starting strip 62 or 78. The tube-forming techniques described herein are, therefore, similar in some respects to "tube sinking." The total length of each tube 34 or 50 produced by the tube forming techniques described herein will be greater than the total length of its respective starting strip 62 or 78 due to the aforenoted longitudinal tube extension. The amount of the extension in each tube substantially corresponds to the aforenoted percentage differentials in strip cross-sectional area versus tube cross-sectional area.

The extra volume of metal or metal alloy also assists in the formation of a tube 34 or 50 having a relatively tight seam 42 or 52 characterized by closely abutting edges 44 or 54 and without a notch or well at the outer periphery of the seam. Further, the edges 44 and 54 forming the seams 42 and 52 respectively are deformed by the tube-forming techniques described herein to provide substantially non-linear and intermeshing edges. This results in an increased surface area of the edges to which a sealing material can adhere as compared to the edges of the starting strips 62 and 78 thereby improving the resultant strength of the seal. This also results in better hermeticity than prior cable assemblies.

The deformed, intermeshing edges 44 and 54 are the inherent result of the tube-forming technique used herein and do not correspond to the shape of the original edges of the strips 62 and 78. The deformed edges 44 and 54 result from the drawing or sinking of the tube by the tube-forming techniques described herein.

Since the strips 62 and 78 are preferably formed into tubes 34 and 50 respectively by being drawn through one or more dies, each starting strip should have sufficient hardness to withstand such processing. Accordingly, each strip should be at least about ¼ hard and preferably at least about full hard.

While outer tube 50 has been described as being formed with a substantially straight longitudinal seam 52, it may also be formed with a helical seam. It is believed that forming the outer tube with a helical seam may provide even greater flexibility to the cable construction.

The starting strips 62 and 78 may have any suitable configuration, for example, each strip could have a trapezoidal cross section.

While the cable construction has been shown as having only protective jacket 58, any number of protective layers may be fabricated about the tube 50.

While the cable 30 may be constructed with or without a filler material 40, the use of a filler material is highly desirable in a cable which may be subjected to high bending or hydrostatic stresses. The filler material 40 has two primary functions. First, it lubricates the fiber or fibers 36 to prevent friction and microbending. Second, it provides the fiber or fibers 36 with a hydrostatic, ambient pressure environment. In a preferred embodiment, the filler material 40 comprises a non-setting void filler such as a gel. However, any suitable non-setting void filler may be utilized.

The solder or brazing materials 46 and 56 may comprise any suitable solder or brazing material known in the art. Preferably a suitable solder material is used to close the seam 42 and/or 52. Suitable soldering materials include silver solders, high-temperature solders and low-temperature solders such as lead-tin solder, lead-antimony solder and tin-antimony solder.

An optical fiber cable fabricated in accordance with the instant invention theoretically can have a substantially infinite length. It is possible to fabricate cable lengths of about 25 km between repeaters using the technique described herein. The cable can be used underground, aboveground, undersea or in any other environment. For example, it may be used to supply data support and power to a deep sea sensor. It may also be used for underground, aboveground and undersea telephone applications.

While the tubes 34 and 50 have been described as being used as electrical conductors, they may also be used as inner and outer signal devices such as alarm systems for providing warning of cable tampering.

While the tube 50 has been illustrated as being a substantially smooth hollow cylinder, it may be corrugated if desired. For example, helical corrugations could be imposed onto the tube 50 if needed. Any suitable apparatus not shown known in the art may be used to corrugate the tube 50.

While the cable fabricating process has been described and shown as being a continuous in-line process, some of the cable fabricating steps may be performed off-line and/or in a discontinuous fashion.

The patents, patent applications and publications set forth in the specification are intended to be incorporated by reference herein.

It is apparent that there has been provided in accordance with this invention a two-pole ruggedized optical fiber cable and method and apparatus for forming the same which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An optical fiber cable for use in communication applications, said cable comprising:
   an inner tubular member formed from a first metallic material having an electrical conductivity in the range of about 25% to about 102% IACS, a yield strength of at least about 30 ksi, a yield strain in the range of about 0.15% to about 1% and a minimum tensile strength of about 45 ksi at 400° F.;
   at least one optical fiber housed within said tubular member; and
   an outer tubular member surrounding said inner tubular member, said outer tubular member being formed from a non-ferrous metal alloy having a yield strength in the range of about 100 ksi to about 180 ksi and a yield strain in the range of about 0.57% to about 1%,
   whereby said outer tubular member acts as the primary strength member of said cable.

2. The optical fiber cable of claim 1 wherein:
   said non-ferrous metallic material forming said outer tubular member has a yield strength in the range of about 125 ksi to about 150 ksi and a yield strain in the range of about 0.7% to about 0.9%.

3. The optical fiber cable of claim 1 further comprising:
   said non-ferrous metal alloy having an electrical conductivity in the range of about 2% to about 10% IACS,
   whereby said inner and outer tubular members act as a pair of coaxial electrical conductors.

4. The optical fiber cable of claim 3 wherein said non-ferrous metal alloy comprises a non-ferrous alloy having a modulus of elasticity less than about $20 \times 10^6$ psi.

5. The optical fiber cable of claim 3 wherein said non-ferrous metal alloy comprises:
   a copper alloy consisting essentially of at least one alloying element selected from the group consisting of aluminum, silicon, cobalt, tin, phosphorous, magnesium, nickel and chromium as well as combinations thereof and being present in said alloy in an effective amount up to about 5% by weight of said alloy and the balance essentially copper.

6. The optical fiber cable of claim 3 wherein said non-ferrous metal alloy comprises:
   a copper alloy consisting essentially of at least one alloying element selected from the group consisting of aluminum, silicon, cobalt, tin, phosphorous, magnesium, nickel and chromium as well as combinations thereof and being present in said alloy in an effective amount up to about 15% by weight of said alloy and the balance essentially copper.

7. The optical fiber cable of claim 1 wherein said outer tubular member further comprises a solid, hollow, cylindrical, unitary tubular member.

8. The optical fiber cable of claim 1 further comprising:
   each of said tubular members being a drawn tube.

9. The optical fiber cable of claim 1 wherein said first metallic material forming said inner tubular member comprises:
   a copper alloy consisting essentially of at least one alloying element selected from the group consisting of zirconium. chromium, iron, magnesium, phosphorous, nickel, silicon, tin and silver as well as combinations thereof and being present in said alloy in an effective amount up to about 5% by weight of said alloy and the balance essentially copper.

10. The optical fiber cable of claim 1 further comprising:
    a layer of dielectric material separating said tubular members.

11. The optical fiber cable of claim 10 further comprising: :
    said outer tubular member being formed with a seam; and
    said seam being closed by a sealing material other than said metal alloy to provide said cable with added hermeticity.

12. The optical fiber cable of claim 11 further comprising:
    said inner tubular member being formed with a seam; and
    said seam in said inner tubular member being closed by a sealing material other than said first metallic material.

13. The optical fiber cable of claim 1 further comprising:
    a protective jacket about said outer tubular member.

14. A process for fabricating an optical fiber cable for use in communication applications, said process comprising:
    providing a first strip of material having an electrical conductivity in the range of about 25% to about 102%, IACS, a yield strength of at least about 30 ksi, yield strain in the range of about 0.15% to about 1% and a minimum tensile strength of about 45 ksi at 400° F.;
    providing at least one forming die;
    forming a first tubular member by drawing said first strip through said at least one die;
    inserting at least one optical fiber into said tubular member;
    providing a second strip of material having a yield strength in the range of about 100 ksi to about 180 ksi, a yield strain in the range of about 0.57% to about 1%, and a conductivity in the range of about 2% to about 10% IACS,
    providing at least one additional forming die; and
    forming a second tubular member about said first tubular member by drawing said second strip through said at least one additional die and inserting said first tubular member and said at least one optical fiber into said forming second tubular member,
    whereby said second tubular member acts as the primary strength member of said cable.

15. The process of claim 14 wherein said first tubular member forming step comprises:
    drawing said first strip through a first die and forming a first open tube section; and
    drawing said open tube section through a second die and forming said first tubular member.

16. The process of claim 15 wherein said second tubular member forming step comprises:
    drawing said second strip through a third die and forming a second open tube section; and
    drawing said second open tube section through a fourth die and forming said second tubular member.

17. The process of claim 16 further comprising:

said second tubular member forming step comprising
 forming said second tubular member with a seam; and
 sealing said seam to provide said cable with added hermeticity.

18. The process of claim 17 further comprising:
 fabricating a layer of dielectric material between said first and second tubular members.

19. The process of claim 18 further comprising:
 fabricating a protective jacket about said second tubular member.

20. An apparatus for fabricating an optical fiber cable having drawn inner and outer tubular members, said drawn inner tubular member being formed from a first strip of material having an electrical conductivity in the range of about 25% to about 102% IACS, a yield strength of at least about 30 ksi, a yield strain in the range of about 0.15% to about 1% and a minimum tensile strength of about 45 ksi at 400° F. and said drawn outer tubular member being formed from a second strip of material having a yield strength in the range of about 100 ksi to about 180 ksi, a yield strain in the range of about 0.57% to about 1% and a conductivity in the range of about 2% to about 10% IACS, said apparatus comprising:
 at least one die for forming said first strip into said drawn inner tubular member;
 means for inserting at least one optical fiber into said inner tubular member; and
 means for forming said drawn outer tubular member about said inner tubular member, said forming means comprising at least one additional die for forming said second strip into said outer tubular member.

21. The apparatus of claim 20 wherein said at least one die for forming said inner tubular member comprises:
 a first die for forming said first strip into a first open tube section; and
 a second die for forming said open tube section into said inner tubular member.

22. The apparatus of claim 21 wherein said at least one additional die for forming said second strip into said outer tubular member comprises:
 a third die for forming said second strip into a second open tube section; and
 a fourth die for forming said second open tube section into said outer tubular member.

23. The apparatus of claim 22 further comprising:
 said fourth die forming said outer tubular member with a seam having closely abutting edges; and
 means for sealing said seam to provide said cable with added hermeticity.

24. The apparatus of claim 23 further comprising:
 means for fabricating a layer of dielectric material between said inner and outer tubular members.

25. The apparatus of claim 24 further comprising:
 means for fabricating a protective jacket about said outer tubular member.

* * * * *